(12) United States Patent
Mazzurco et al.

(10) Patent No.: US 7,158,478 B1
(45) Date of Patent: Jan. 2, 2007

(54) METHOD AND APPARATUS FOR SIGNALLING IN A SHARED PROTECTION RING ARCHITECTURE

(75) Inventors: Anthony Mazzurco, Plano, TX (US); Joseph A Crossett, III, Richardson, TX (US); Scott A Thompson, Lucas, TX (US)

(73) Assignee: Alcatel, Paris (FR)

( * ) Notice: Subject to any disclaimer, the term of this patent is extended or adjusted under 35 U.S.C. 154(b) by 781 days.

(21) Appl. No.: 09/903,268

(22) Filed: Jul. 11, 2001

(51) Int. Cl.
*H04L 12/42* (2006.01)

(52) U.S. Cl. .............................. 370/222; 398/3; 398/7

(58) Field of Classification Search ........ 370/216–228, 370/242–252, 258; 398/1–8, 59
See application file for complete search history.

(56) References Cited

U.S. PATENT DOCUMENTS

| | | | |
|---|---|---|---|
| 5,179,548 A | 1/1993 | Sandesara | |
| 5,442,623 A | 8/1995 | Wu | |
| 5,805,320 A | 9/1998 | Kuroyanagi et al. | |
| 5,870,212 A | 2/1999 | Nathan et al. | |
| 5,875,272 A | 2/1999 | Kewitsch et al. | |
| 5,884,017 A | 3/1999 | Fee et al. | |
| 5,903,370 A | 5/1999 | Johnson | |
| 5,982,517 A | 11/1999 | Fishman | |
| 5,986,783 A | 11/1999 | Sharma et al. | |
| 6,038,044 A | 3/2000 | Fee et al. | |
| 6,046,833 A | 4/2000 | Sharma et al. | |
| 6,144,633 A * | 11/2000 | Ikeda et al. ................. | 370/217 |
| 6,278,689 B1 | 8/2001 | Afferton | |
| 6,295,146 B1 | 9/2001 | Nathan et al. | |
| 6,400,859 B1 | 6/2002 | de Boer et al. | |
| 6,512,611 B1 | 1/2003 | Phelps et al. | |
| 6,606,427 B1 | 8/2003 | Graves et al. | |
| 6,616,349 B1 | 9/2003 | Li et al. | |
| 6,616,350 B1 * | 9/2003 | de Boer et al. ................. | 398/9 |
| 6,654,341 B1 * | 11/2003 | Chi et al. ................... | 370/216 |
| 6,683,849 B1 * | 1/2004 | Langridge et al. .......... | 370/223 |
| 6,721,502 B1 | 4/2004 | Al-Salameh et al. | |
| 6,735,392 B1 | 5/2004 | Elahmadi et al. | |
| 6,785,438 B1 | 8/2004 | Lin et al. | |
| 2002/0048066 A1 | 4/2002 | Antoniades et al. | |
| 2003/0156317 A1 | 8/2003 | Ruhl et al. | |
| 2003/0194231 A1 | 10/2003 | Badr | |

FOREIGN PATENT DOCUMENTS

| | | |
|---|---|---|
| CA | 2 317 907 A1 | 6/2001 |
| EP | 1 111 831 A | 6/2001 |
| WO | WO 99/23773 A | 5/1999 |
| WO | WO 99/23773 A1 | 5/1999 |
| WO | WO 01/31821 A | 5/2001 |

OTHER PUBLICATIONS

GR-1230-Core Issue 3, Dec. 1996, Bellcore, Section 6.2.2, pp. 6-16 and 6-19.*
G.841, ITU-T, Oct. 1998, Section 7.2.4.1.2, pp. 58-61.*

(Continued)

*Primary Examiner*—Hassan Kizou
*Assistant Examiner*—Habte Mered
(74) *Attorney, Agent, or Firm*—Anderson, Levine & Lintel; Jessica W. Smith; V. Lawrence Sewell (57) ABSTRACT

A communication network using a ring structure incorporates shared protection channels (22ab, 22bc, 22bd) to reduce costs in implementing protection spans. The shared protection network elements (12a, 12b, 12c, 12d) use a protocol of conventional messaging to integrate with traditional fully redundant network elements.

18 Claims, 11 Drawing Sheets

OTHER PUBLICATIONS

GR-1230-CORE, SONET Bidrectional Line-Switched Ring Equipment Generic Criteria, Issue 4, Dec. 1998, Section 3.7.
GR-253-CORE, Synchronous Optical Network (SONET) Transport Systems: Common Generic Criteria, Issue 3, Sep. 2000, Section 5.3.2.2, 5.3.3.

Aguirre-Torres, et al.; Assessment of IP Network Interruptions on End-System Applications; Proceedings of the European Conference on Networks and Optical Communications 2000; pp. 65-72; Amsterdam.

* cited by examiner

METHOD AND APPARATUS FOR SIGNALLING IN A SHARED PROTECTION RING ARCHITECTURE

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to shared protection architectures.

2. Description of the Related Art

Over the last decade, the importance of telecommunications has increased dramatically. In order to accommodate the vast amount of information passed over telecommunications systems, such as the Public Switched Telephone Network (PSTN) and data networks, copper wires are being replaced with optical fibers, which are capable of carrying significantly more information.

A single fiber may transmit information over many different channels using DWDM (dense wavelength division multiplexing) techniques. Improvements in fiber technology and electronics are increasing the number of channels that may be distinguished over a fiber and, thus, the amount of information that may be passed by a single fiber.

Increases in information bandwidth over a fiber, however, increase the importance of providing mechanisms to bypass failures in the network, until the failure can be corrected. Common failures include, for example, fiber breakages (typically caused by construction activities inadvertently cutting a fiber), fiber disconnects caused by accidents in the central office, and network element failures, such as laser failures.

Figure 1A:
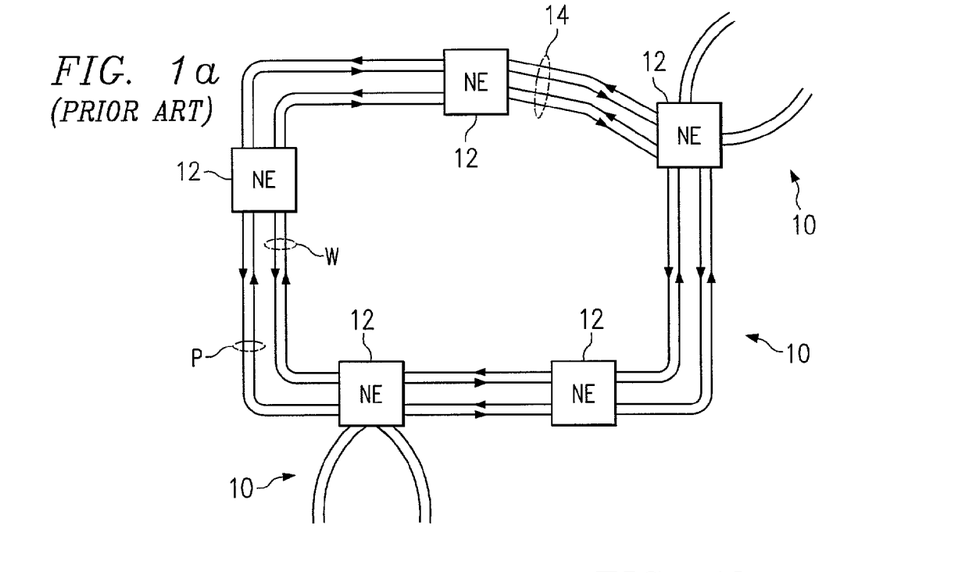
FIGS. 1a and 1b illustrate prior art ring architectures.

In order to maintain communications in spite of a failure, ring architectures are often used. In a ring architecture, a series of network elements are connected in a ring, such as shown in FIG. 1. Each ring 10 has multiple network elements 12 coupled to one another to form a closed loop. Typically, there are four fibers 14 connecting adjacent network elements 10—two working fibers and two protection fibers, although other configurations are possible. The working fibers (W) carry traffic between adjacent nodes. Protection fibers (P) are available to carry traffic in the event of a working fiber failure. The protection fibers also convey control information between network elements; when not being used for traffic, the protection fibers may carry low-priority interruptible traffic. As shown in FIG. 1, network elements 12 may be shared between different rings.

Figure 1B:
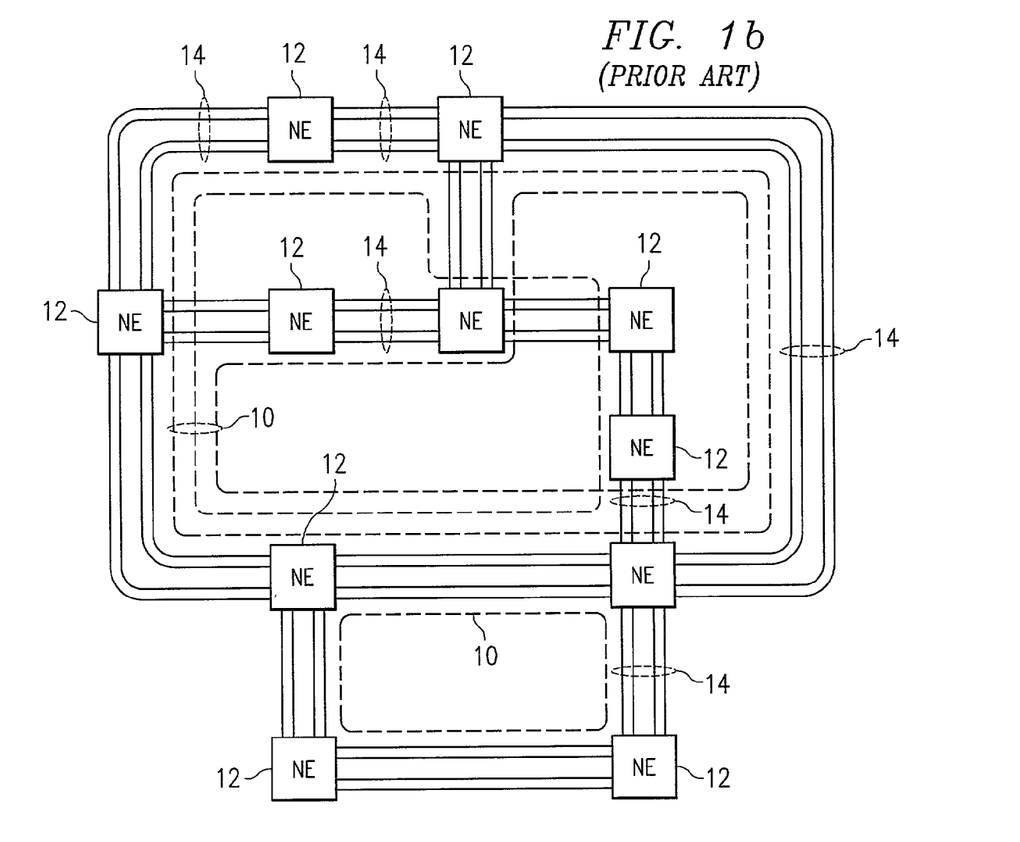

The ring architecture shown in FIG. 1a is a very simple architecture. In many circumstances, multiple rings 10 may connect various network elements 12 as shown in FIG. 1b. Failures of a working fiber in any of the rings 10 may cause protect lines in multiple rings to be used.

Figure 2A:
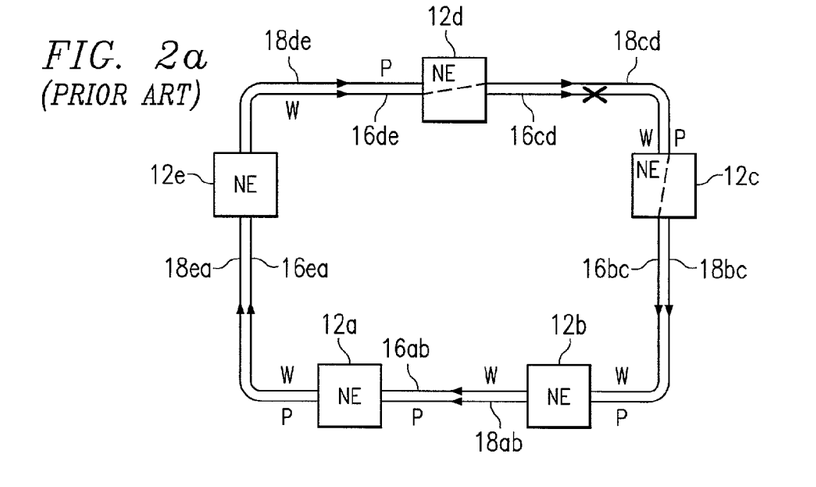
FIGS. 2a and 2b illustrate prior art span switches and ring switches, respectively.

FIG. 2a illustrates one prior art method of circumventing a failure of a working fiber W. In this embodiment, a ring 10 having five network elements 12 (referenced individually as network elements 12a–12e) has a broken working fiber W between network elements 12c and 12d. For purposes of illustration, only one working fiber W and one protection fiber P is shown, it being understood that a similar pair of working and protection fibers are used for traffic in the opposite direction. To pass traffic between network elements 12c and 12d, network element 12d connects the working lines 16de to protect lines 18cd and network element 12c connects working lines 16bc to protect lines 18cd. In other words, traffic that would normally be routed over working lines 16cd is switched to the associated protect lines 18cd. This is referred to as a "span" switch.

Figure 2B:
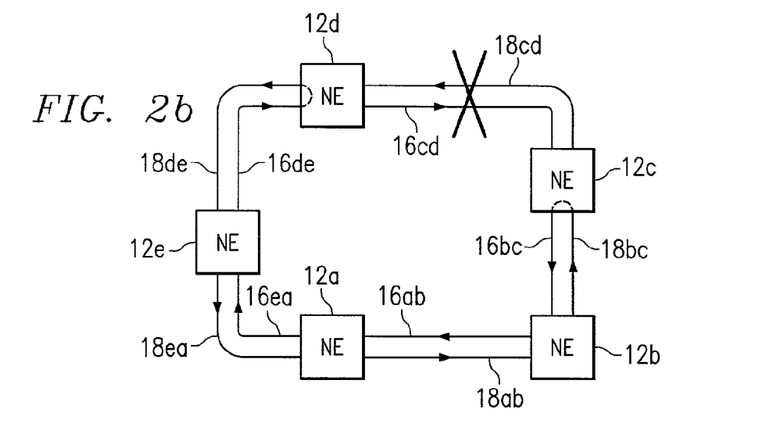

FIG. 2b illustrates a situation where both the working and protection lines have failed between network elements 12c and 12d. In this case, a "ring" switch is implemented where working line 16de is rerouted to protect line 18de and working line 16bc is rerouted to protect line 18bc. Accordingly, the remaining viable protect lines all carry traffic. Every network element can still communicate with all the other network elements 12 on the ring.

Figure 3:
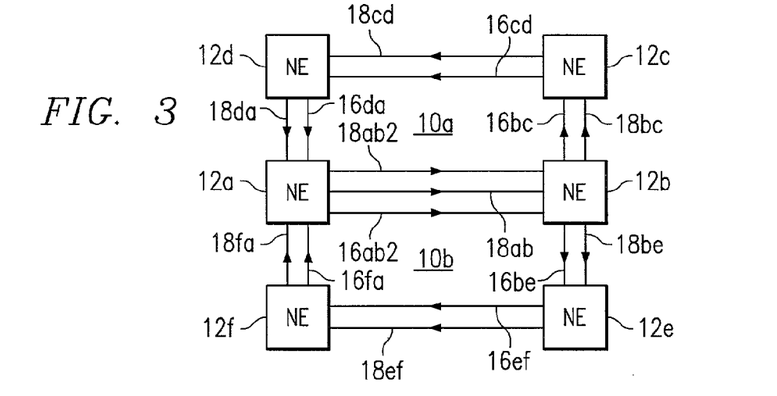
FIG. 3 illustrates a prior art shared protection scheme.

FIG. 3 illustrates an architecture wherein two rings 10a and 10b share a protection path between network elements 12a and 12b. In WO 99/23773 (PCT/IB98/01955) to Elahmadi et al, the use of a single physical span between these two network elements is proposed. This single span provides protection for two rings 10a and 10b. A failure on either ring can be remedied by using the shared protect line 18ab to carry traffic. This architecture reduces costs, which can be significant if the distance between the shared network elements is long (or there are other infrastructure costs involved), but increases the chance of a traffic outage on one ring if a failure occurs while there is another failure on another ring.

Another problem with shared protection spans is the lack of an established protocol. To realize the full cost savings inherent in one or more shared protection spans, it is desirable that traditional, fully redundant network elements be used in portions of the rings. Preferably, the operation of the shared protection network elements can be transparent to the traditional network elements, eliminating costs involved in replacing or modifying the traditional network elements. Further, it is important to maximize the use of shared spans to correct failures, so that communications traffic is maintained as much as possible.

Therefore, a need has arisen for a method and apparatus for using shared protect lines along with traditional protection architectures as efficiently as possible.

BRIEF SUMMARY OF THE INVENTION

In the present invention, a method and apparatus for controlling communications in a shared protection architecture is provided, where first and second network elements support communications over a plurality of working channels of respective rings using a shared protection channel common to all of the rings. Responsive to an indicated span switch on a first ring, control information for the first ring is passed over the shared protection channel while the network elements indicate the availability of the shared protection channel to rings other than the first ring. Responsive to an indication that the shared protection channel is needed to pass communications traffic for a second ring, the network element cease to pass the control information for the first ring over the shared protection channel and indicate the non-availability of the shared protection channel to rings other than the second ring.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 4–17 of the drawings, like numerals being used for like elements of the various drawings.

Figure 4:
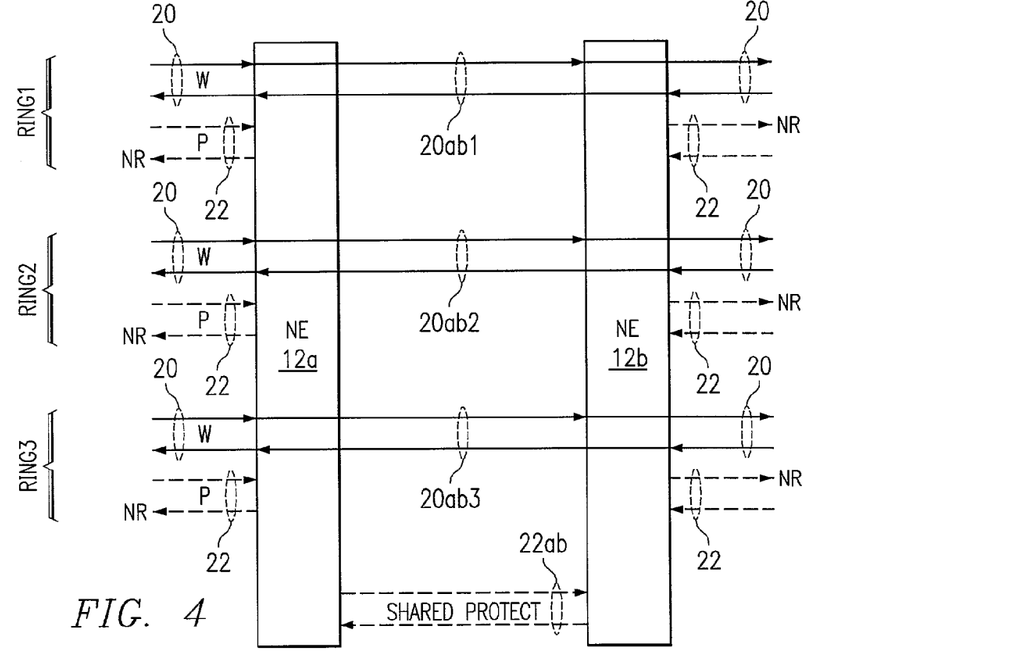
FIG. 4 illustrates a shared protection span with no communications errors on any associated ring.

FIGS. 4–8 illustrate a pair of network elements 12a and 12b using a shared protection channel 22ab communicating as different switches are implemented to maintain communication in various rings. In the illustrated embodiment, three rings, Ring1, Ring2 and Ring3, are coupled to the each network element 12a and 12b. For purposes of illustration, only one channel pair, a working channel pair 20 and a protection channel pair 22, are shown from each ring; these channel pairs are supported by a single shared protection channel pair 22ab. In normal operation, as shown in FIG. 4, working channels 20ab1 are coupled to working channels 20 of Ring1, working channels 20ab2 are coupled to working channels 20 of Ring2 and working channels 20ab3 are coupled to working channels 20 of Ring3. Working channels 20 would typically be from separate fibers coupled to the network elements, although they could be channels from separate rings carried on a single fiber. In an actual implementation, each network element would be coupled to multiple fibers, each fiber providing communication over many channels. Similarly, the protection line between network elements 12a and 12b would support multiple channels as well. The illustrated embodiments of FIGS. 4–8 are used to show the operations that occur between sets of channels of the various fibers and rings coupled to the network elements that are protected using a shared protection channel.

During normal operation the shared protection channels may be used to transfer control information between network elements 12a and 12b. A NR (no requests) signal is output from both network elements 12a and 12b on their outgoing protection channels 22 during normal operation.

Figure 5:
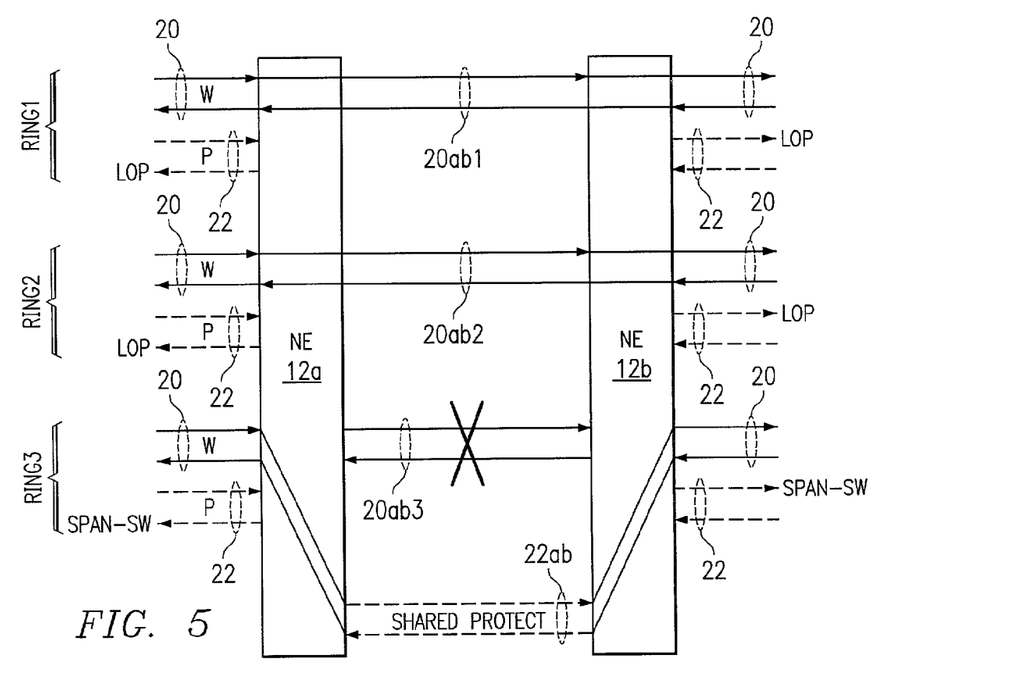
FIG. 5 illustrates a shared protection span with a working channel failure between shared protection network elements.

FIG. 5 illustrates the operation of the network elements 12a and 12b where a working channel between the network elements fails. In FIG. 5, working channel 20ab3 fails. This causes a span switch to occur at both network elements 12a and 12b, and the shared protection channel pair 22ab is used to pass traffic from the working channels 20 of Ring3. The network elements 12a and 12b output a SPAN-SW (span switch signal) on their respective outgoing, non-shared protection channels 22 for Ring3 and output a LOP (lockout of protection) signal on the outgoing protection channels for Ring1 and Ring2. The LOP signal indicates that the shared protection channel pair 22ab between network elements 12a and 12b is no longer available. The LOP signal includes a field indicating the source of the signal. The LOP is output as long as the span switch is in place.

Figure 6A:
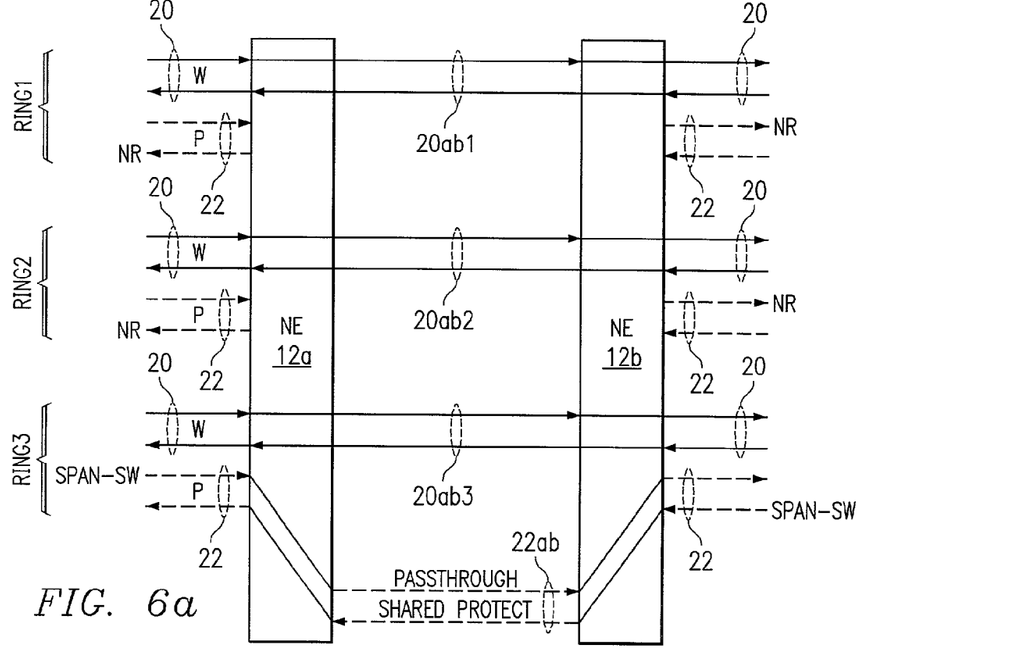
FIG. 6a illustrates a shared protection span with an indicated span switch on one ring.

FIG. 6a illustrates the operation of the network elements 12a and 12b where a span switch occurs elsewhere on a ring coupled to network elements 12a and 12b. In FIG. 6, a span switch has occurred on Ring3, thus causing a SPAN-SW signal to be received on the incoming protection channels 22 of Ring3 at the network elements 12a and 12b. In order to propagate the SPAN-SW signal, the shared protection channel pair 22ab is coupled between the protection channels 22 of Ring3. NR signals are output on outgoing, non-shared protection channels for Ring1 and Ring2, since the shared protection channel pair 22ab is still available, if necessary, to pass communications traffic, which would be considered a higher priority, as will be shown below.

Figure 6B:
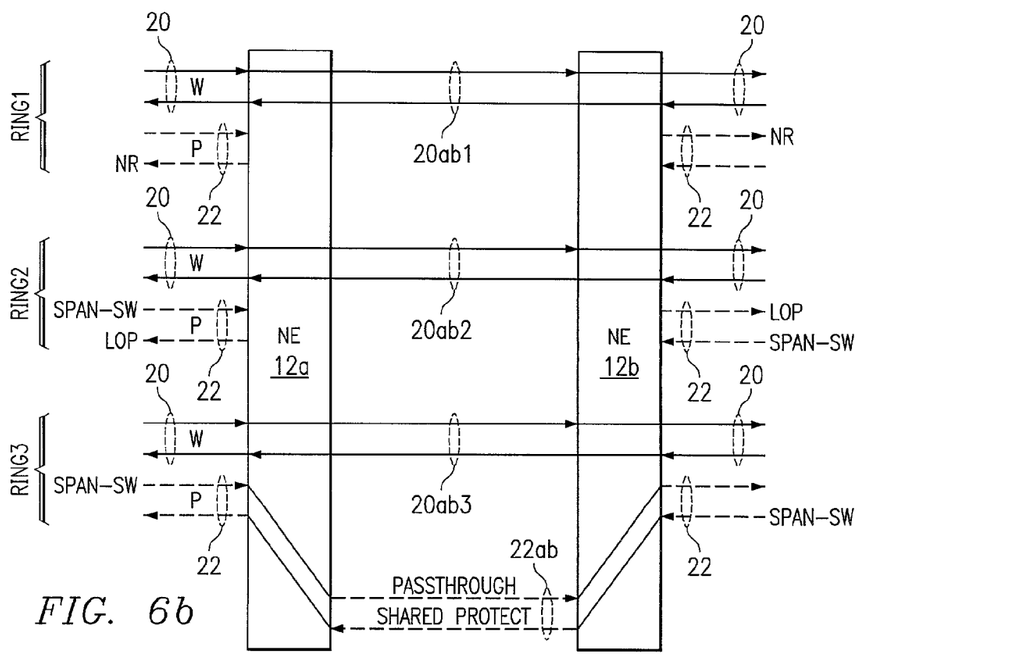
FIG. 6b illustrates a shared protection span with an indicated span switch on two rings.

In FIG. 6b, a second span switch on Ring2 occurs in addition to the span switch on Ring3, as indicated by the SPAN-SW signal on the incoming protection channels 22 of Ring 2. Since the shared protection channel pair 22ab is being used to passthrough the signals from protection channels 22 of Ring3, it is not available for a second passthrough operation. Hence, a LOP is signal is output on outgoing, non-shared protection channels 22 for Ring2. A NR signal is still placed on the outgoing, non-shared protection channels 22 of Ring1, since the shared protection channels 18ab are still available to correct a communications failure. If the failure necessitating the span switch is corrected, the LOP signal is dropped and Ring2 could use the shared protection channel pair for control information passthrough. Also, if the failure necessitating the span switch on Ring2 is corrected, the LOP is dropped as well.

Figure 7:
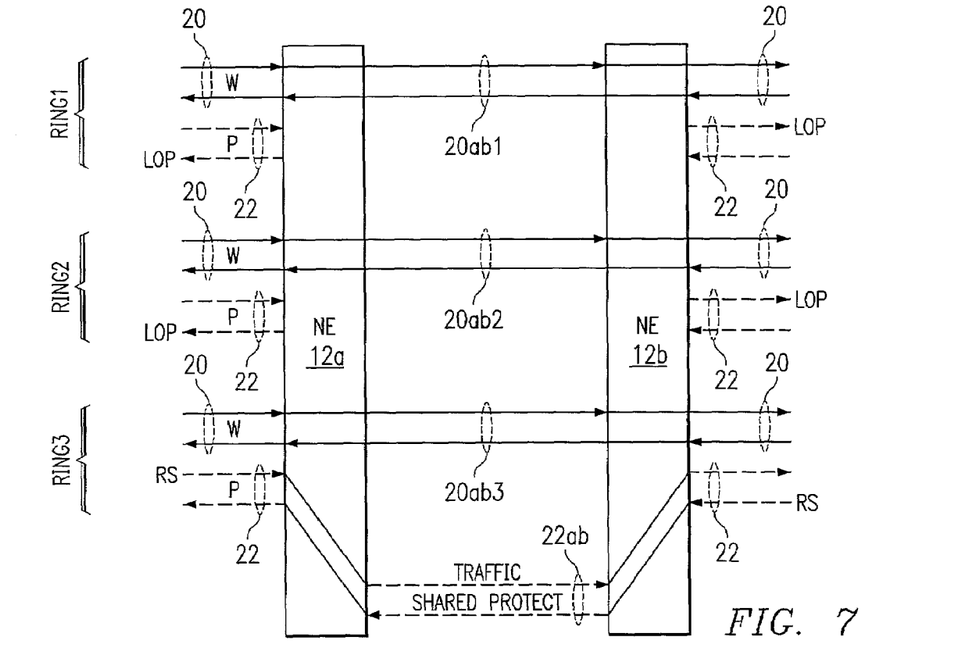
FIG. 7 illustrates a shared protection span with an indicated ring switch on one ring.

In FIG. 7, a ring switch is indicated on Ring3, as indicated by the RS (ring switch) signal received at the incoming protection channels 22 of Ring3. In this case, the protection channels 22 will be used to pass communications traffic once the ring switch is set up. The RS signals are passed over the shared protection channels to the outgoing protection channels 22, so that every network element 12 in the ring receives an indication that a ring switch is needed. An ACK (acknowledge) signal (not shown) is returned to complete the setup protocol. The protection channels 22 of Ring3 are then coupled to the shared protection channel pair 22ab to pass communications traffic. A LOP signal is placed on the outgoing, non-shared protection channels of Ring1 and Ring2, since the shared protection channels are no longer available. When the ring switch is dropped, the LOP signal is dropped as well.

Figure 8:
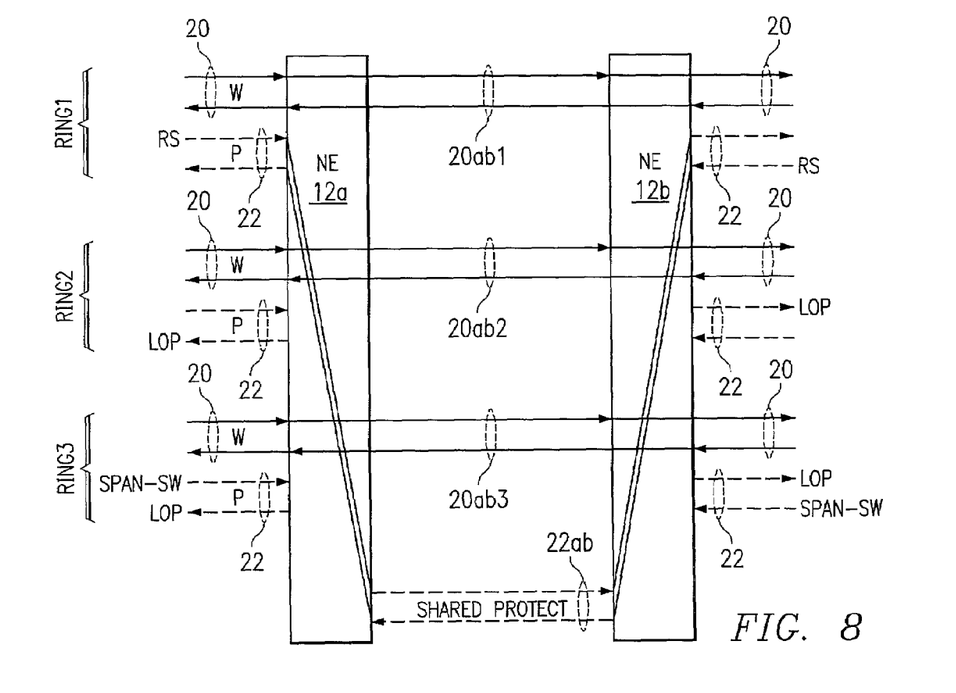
FIG. 8 illustrates a shared protection span with an indicated span switch on one ring followed by an indicated ring switch on another ring.

In FIG. 8, a span switch on Ring3 is superceded by a ring switch on Ring1. The initial condition for the span switch on Ring2 is shown in FIG. 6a. When the RS signal is received at the incoming protection channels of Ring1, the shared protection channel pair 22ab is decoupled from passing control information from the protection channels 22 of Ring3 and is coupled to the protection channels 22 of Ring1, which will be passing communications traffic once the ring switch is set up at all of the associated network elements on the ring. To indicate that the shared protection channel pair 22ab is no longer available, a LOP signal is placed on the outgoing, non-shared protection channels 22 of Ring2 and Ring3. It should be noted that this does not affect the passing of traffic over the span switch on Ring3, which remains operable, it only stops the passthrough of the control information through network elements 12a–b.

The passthrough of control information could also be superceded by a span switch between network elements 12a and 12b, as shown in FIG. 5.

Figure 9:
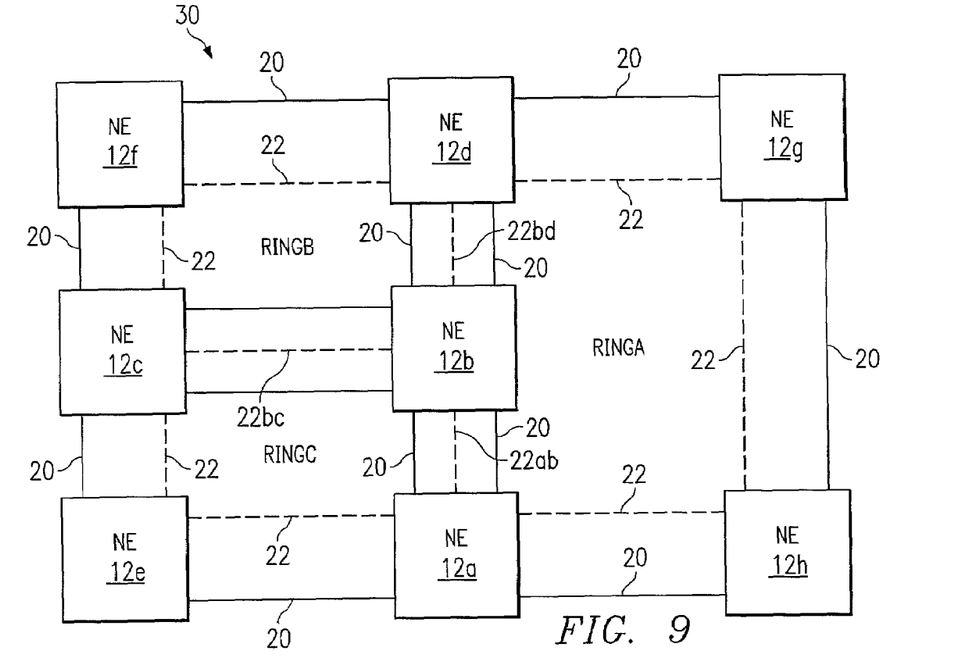
FIG. 9 illustrates an exemplary three ring architecture with no communications errors.

FIGS. 9–16b illustrate the operation of the network elements of FIGS. 4–8 in a multiple ring configuration. FIG. 9 illustrates a network comprising eight network elements 12, individually referenced as network elements 12a–12h. The spans between network elements 12a and 12b, between network elements 12b and 12c, and between network elements 12b and 12d use a shared protection scheme, as shown in FIGS. 4–8. The spans between the remaining network elements use a conventional fully redundant protection scheme.

The network configuration 30 of FIG. 9 provides three ring structures: RingA, RingB and RingC. Network elements 12a, 12b, 12d, 12g and 12h form RingA. Network elements 12b, 12d, 12f and 12c form RingB. Network elements 12a, 12b, 12c and 12e form RingC. As above, working channels 20 are shown in solid line and protection channels 22 are shown in dashed lines. Network elements 12a, 12b, 12c and 12d support shared protection lines as described above. The remaining network elements can be of conventional design.

During normal operation (no working channel or protection channel failures), each of the shared protection network elements 12a–12d output NR signals as described in connection with FIG. 4.

Figure 10:
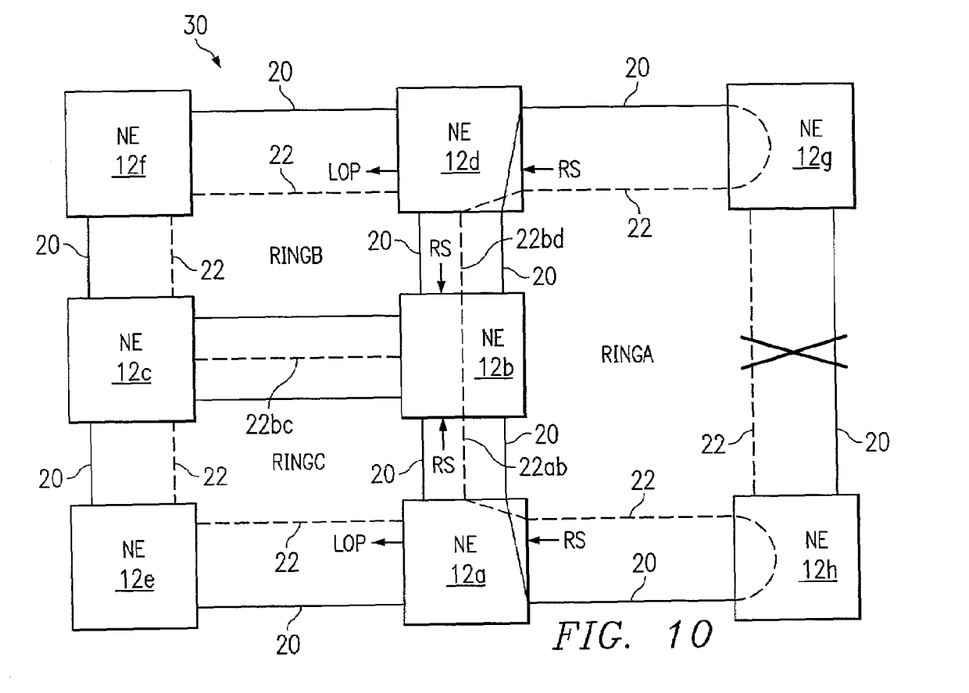
FIG. 10 illustrates the architecture of FIG. 9 with an indicated ring switch on one ring.

FIGS. 10–16b illustrate different failure scenarios. In FIG. 10, a ring switch is indicated away from the shared protection due to a failure of working and protection channels between network elements 12g and 12h. Network elements 12g and 12h will issue RS signals to network elements 12d and 12a, respectively, to set up a ring switch. The RS signals will pass through the remaining network elements in the ring on the shared and non-shared channels (for example, the RS signal from network element 12h will be sent to network element 12a on non-shared protection channel, where it will be passed to network elements 12b and 12d through their shared protection channels, and finally to network element 12g via the non-shared protection channel). An ACK signal will pass in the opposite direction via the same shared and non-shared protection channels. The shared protection network elements that are part of the ring switch, i.e., network elements 12a and 12d, will issue LOP signals on their outgoing, non-shared protection channels, as described in connection with FIG. 7. Network element 12b does not issue a LOP signal, since it is not connected to any outgoing, non-shared protection lines.

Figure 11:
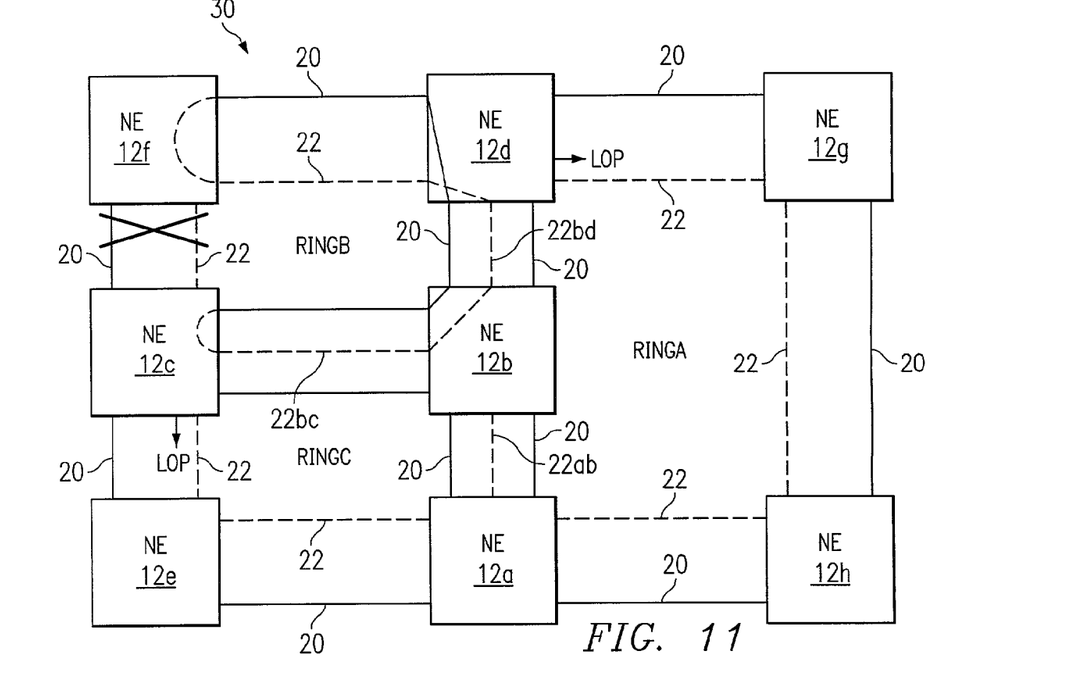
FIG. 11 illustrates the architecture of FIG. 9 with an indicated ring switch on a different ring.

FIG. 11 illustrates the effect of a loss of working and protection channels between network elements 12c and 12f. In this case, a ring switch is set up around RingB, with network elements 12c and 12f performing the coupling of the working and protection channels. Each network element in RingB that is coupled to a non-shared protection channel outside of the RingB issues an LOP signal. Hence, network element 12c issues a LOP signal to network element 12e and network element 12d issues a LOP signal to network element 12g.

Figure 12:
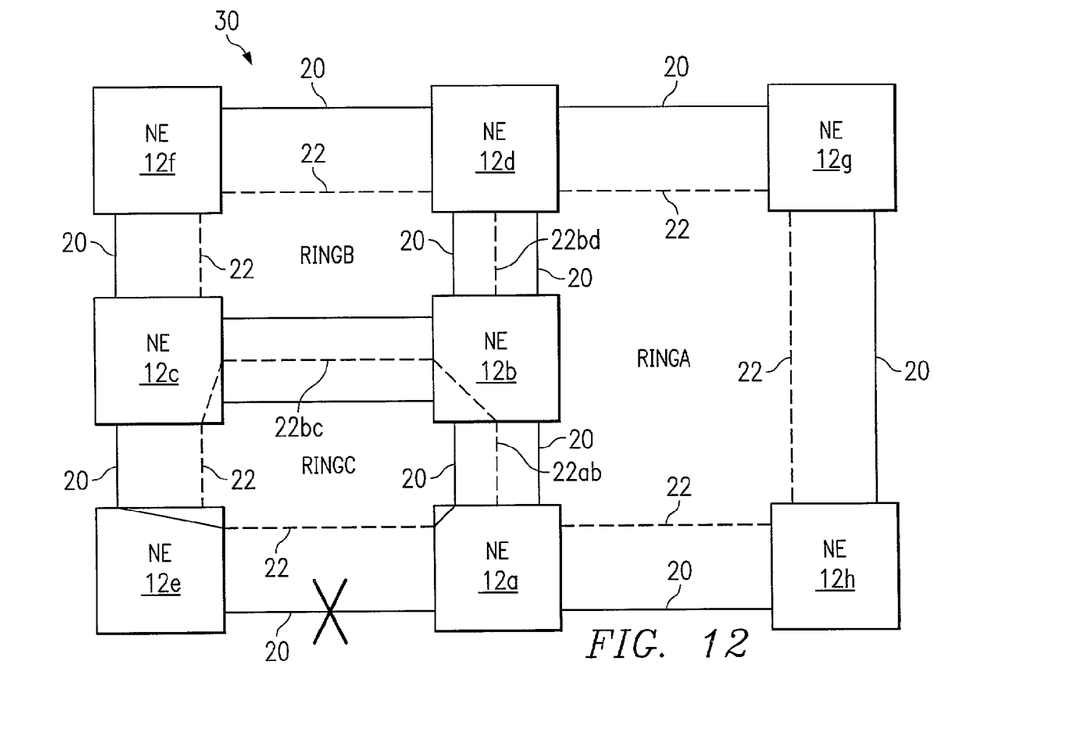
FIG. 12 illustrates the architecture of FIG. 9 with an indicated span switch on one ring.

In FIG. 12, a span switch is implemented to circumvent a working channel failure between network elements 12a and 12e. Network element 12e couples the working channel from network element 12c with the protection channel from network element 12a; network element 12a couples the working channel from network element 12b with the protection channel from network element 12c. The shared protection channels 22ab and 22bc are placed in passthrough mode to pass control information around RingC.

Figure 13:
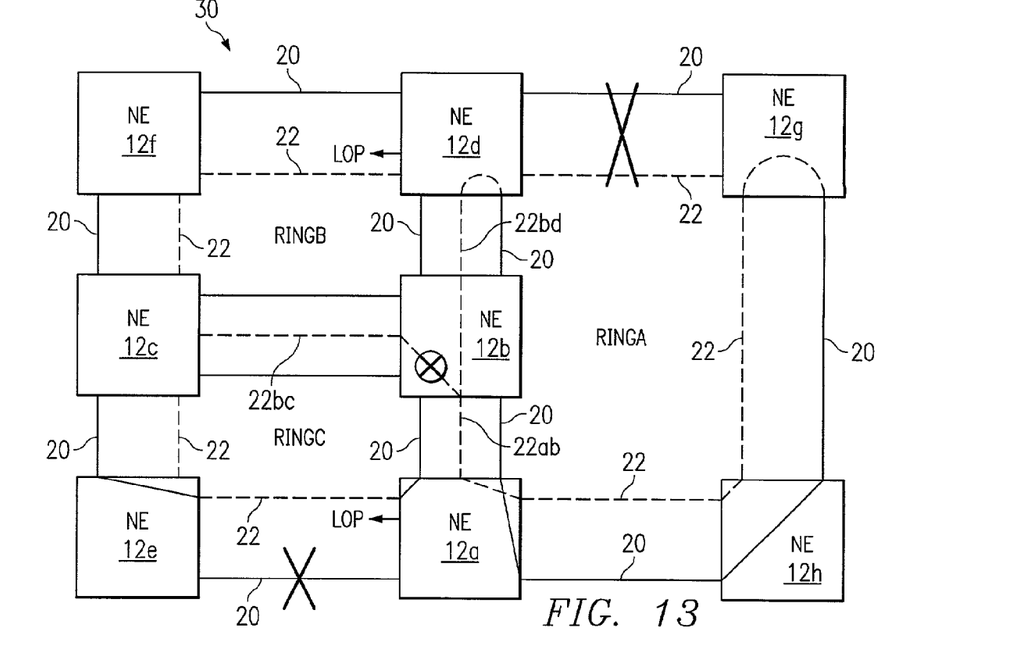
FIG. 13 illustrates the architecture of FIG. 9 with an indicated span switch on one ring followed by a ring switch on another ring.

FIG. 13 illustrates a span switch in RingC followed by a ring switch in RingA caused by a loss of working and protection channels between network elements 12d and 12g. The initial condition caused by the span switch in RingA will be the same as shown in FIG. 12. Specifically, the shared protection channels 22ab and 22bc will be used to pass control information for RingC. The ring switch in RingA, however, supercedes the control passthrough in RingC (the span switch continues to function without passing the control information). Consequently, shared protection channel 22ab stops passing control information for RingC and is used to setup the ring switch in RingA by passing RS and ACK signals. Subsequently, protection channel 22ab is used to pass traffic for the ring switch. An LOP signal is output to network element 12a to network element 12e and from network element 12d to network element 12f.

Figure 14:
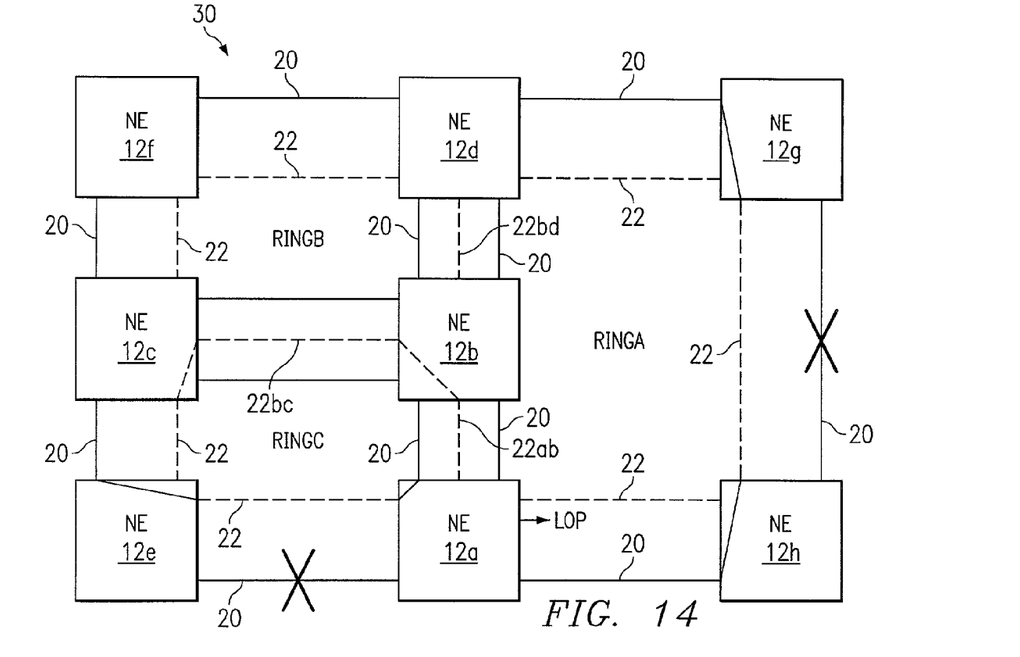
FIG. 14 illustrates the architecture of FIG. 9 with two ring switches formed pursuant to a failure of working and shared protection spans.

FIG. 14 illustrates a span switch in RingC followed by a span switch in RingA, caused by a working channel failure between network elements 12g and 12h. The initial condition for the span switch in RingC is shown in FIG. 12. The span switch in RingC causes a SPAN-SW signal to be sent from network element 12h to network element 12a and from network element 12g to network element 12d. Since the shared protection channel pair 22ab is used by the span switch in RingC, network element 12a returns a LOP signal to network element 12h, indicating that the shared protection channel 22ab is not available to pass control information; nonetheless, the span switch can be implemented to pass communications traffic over the protection channel between network elements 12g and 12h.

Figure 15:
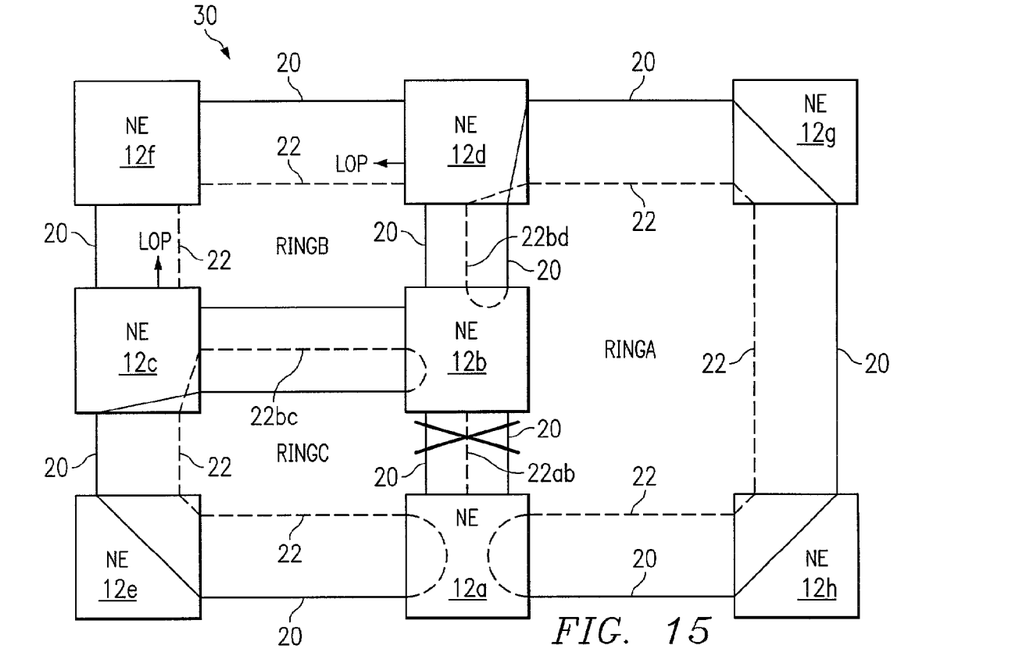
FIG. 15 illustrates the architecture of FIG. 9 with an indicated span switch on one ring followed by an indicated span switch on another ring.

In FIG. 15, ring switches in RingC and RingA are necessitated by a failure of the working and shared protection channels between network elements 12a and 12c. Shared protection channel 22bd is used for the ring switch for RingA; the remaining spans of the ring switches are made using non-shared channels. Network element 12c issues a LOP signal to network element 12f and network element 12d issues a LOP to network element 12f. The remaining network elements are involved in the ring switch and do not receive LOP signals.

Figure 16A:
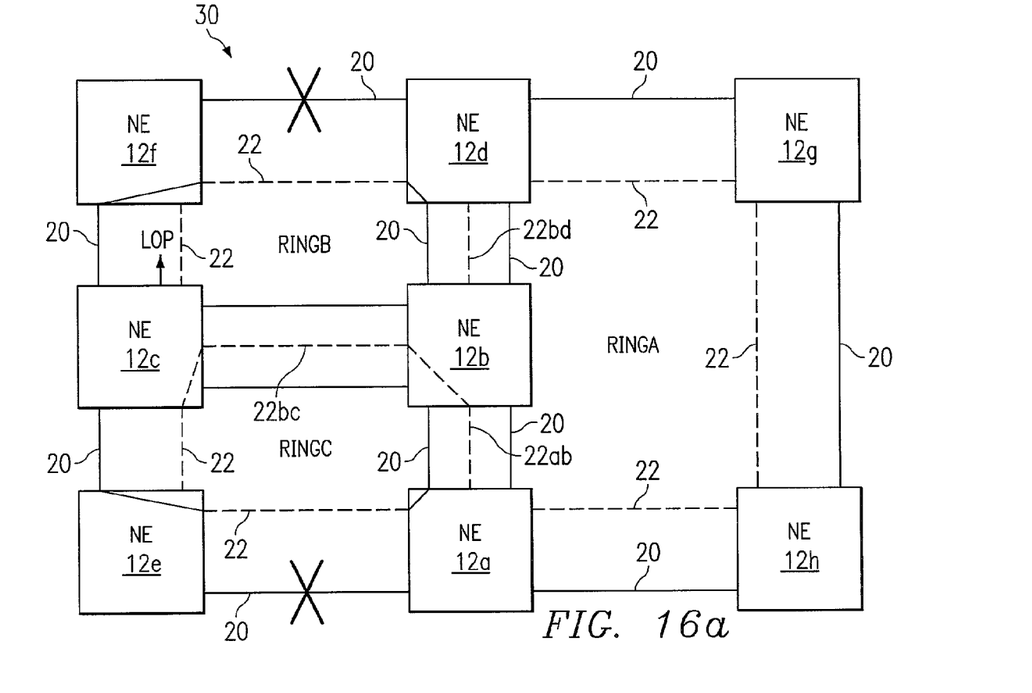
FIGS. 16a through 16b illustrate the architecture of FIG. 9 with two spans switches followed by a ring switch.

FIGS. 16a–b illustrate a situation which could involve an isolated network element, but for the prioritization of failure conditions. In FIG. 16a, a working channel failure between network elements 12e and 12a causes a span switch. As shown in connection with FIG. 12, network elements 12a, 12b and 12c provide a passthrough path for control information over shared protection channels 22ab and 22bc. A second span switch is necessitated by a working channel failure between network elements 12d and 12f. In response to receiving the SPAN-SW signal from network elements 12d and 12f, network element 12c issues an LOP signal to network element 12f. At this point, shared protection channel 22bc continues to be used for passing control information for RingC. RingB does not have a passthrough for control information, however, the span switch is still implemented such that communications traffic can pass between network elements 12f and 12d.

Figure 16B:
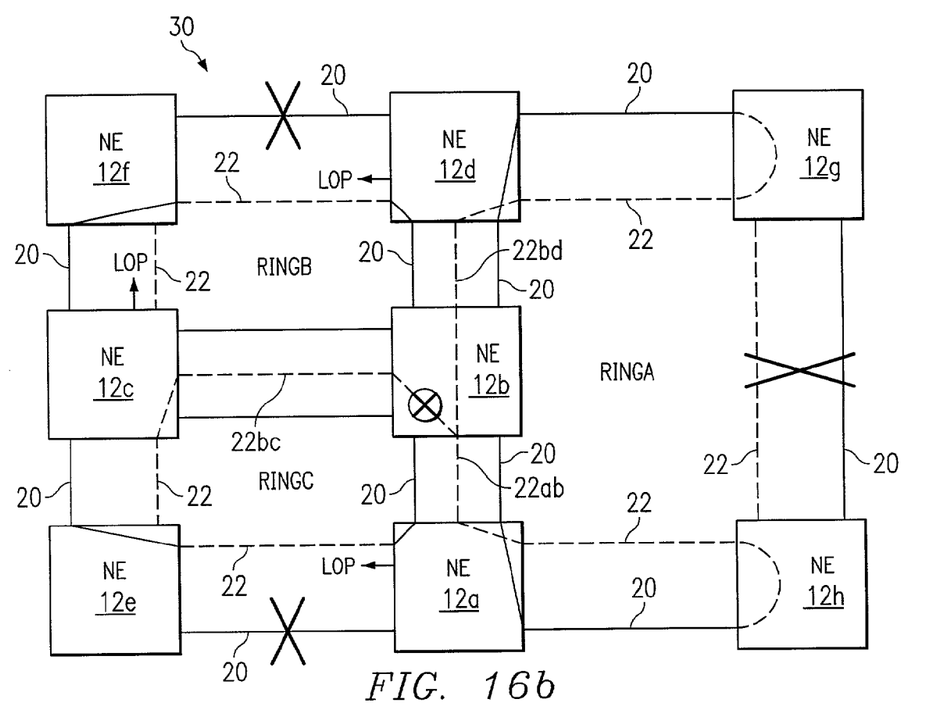

As shown in FIG. 16b, an ensuing failure of working and protection channels between network elements 12g and 12h causes a ring switch on RingA. When network element 12 receives a RS signal, it drops the passthrough of control information for RingC and passes the RS to network element 12b via shared protection channel 22ab. Similarly, network element 12b drops the passthrough of control information through protection channel 22bc and couples shared protection channel 22ab to protection channel 22bd. After the RS and ACK signals have promulgated through each network element in RingA, the ring switch is implemented and shared protection channels 22ab and 22bc are used to pass traffic. LOP signals are generated by network element 12d to network element 12f and by network element 12a to network element 12e.

Figure 17:
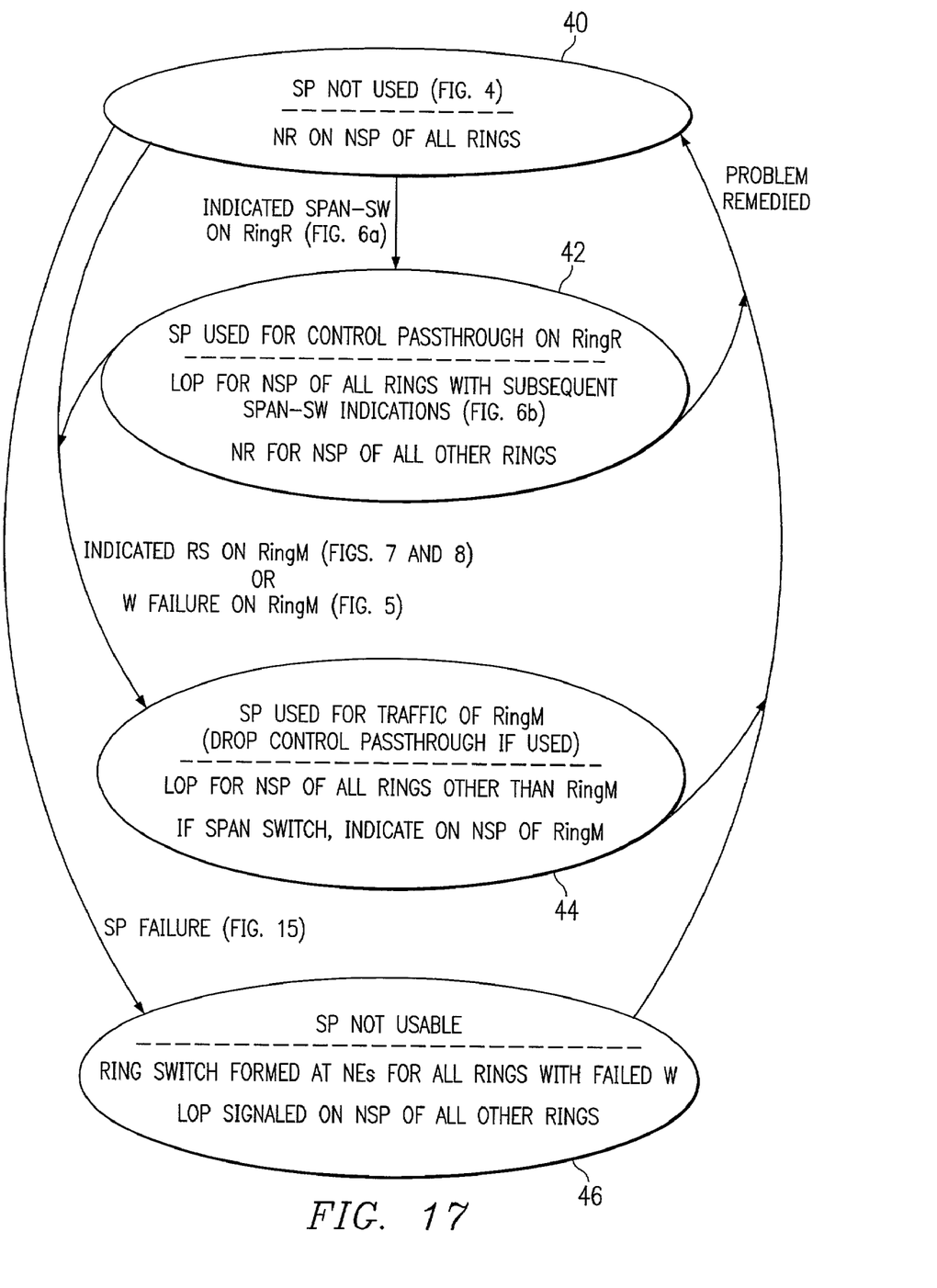
FIG. 17 illustrates a state diagram showing operation of the shared protection network elements.

With reference to FIG. 4, FIG. 17 illustrates a state diagram showing the signals generated by shared protection network elements 12a and 12b according to various states of the shared protection channel 22ab. In state 40, the SP (shared protection channel) 22ab is not being used by any ring coupled to the network elements 12a–b, either for control information passthrough or for communications traffic. As shown in FIG. 4, an NR signal is generated on all outgoing, non-shared protection (NSP) channels 22.

If the network elements 12a–b receive a SPAN-SW signal, indicating a span-switch on a RingR (where RingR is an arbitrary ring supported by the shared protection network elements), the state transitions to state 42, where the shared protection channel 22ab is used for control information passthrough (as shown in connection with FIG. 6a). NR signal are output on the non-shared protection channels 22 for all rings other than RingR, except for rings that subsequently have a SPAN-SW indication. For rings with a subsequent SPAN-SW indication, an LOP signal is generated on the non-shared protection channels 22.

Once the failure is remedied, the state transitions to state 40. If there were subsequent SPAN-SW signals that were still enabled, the state would transition back to state 42.

If a ring switch is indicated on RingM (an arbitrary ring) or the RingM working channel 20ab between the network elements 12a–b fails, while in either state 40 or state 42, the state transitions to state 44, where the shared protection channel is used to carry traffic. In the case of a ring switch, the shared protection channel 22ab is coupled between other protection channels 22 to effect the ring switch (FIG. 7 and FIG. 8). In the case of a working channel failure, the shared protection channel 22ab is coupled between working channels 20 in a span switch (FIG. 5). In either case, LOP signals are generated on the non-shared protection channels of all rings other than RingM. In the case of the span switch, the SPAN-SW signal is generated on the non-shared protection channels associated with RingM.

Again, once the failure is remedied, the state returns to state 40.

If there is a failure of the shared protection channel 22ab, the shared protection channel will be unable to pass either traffic or control information (state 46). In this case, ring switches can be formed for any ring where the associated working channel 20ab has failed as well (FIG. 15). Otherwise, a LOP signal is generated on the non-shared protection channels 22 for each ring. When the failure is corrected, the state returns to state 40. The state could also transition to state 46 from either state 42 or state 44.

The present invention provides significant advantages over the prior art. First, the LOP, NR, RS, and SPAN-SW signals are compatible with fully redundant network elements. The actions taken in response to these signals allow integration of traditional network elements with the shared protection network elements. The prioritization of action based on various conditions described herein provides maximization of the shared protection channels for maintaining communications traffic, while allowing use of the shared protection channels for passing control information where appropriate. Situations where a node could be isolated from status signals from other network elements due to multiple line failures, such as shown in FIGS. 16a–b, are eliminated; therefore, all network elements may participate restorations regardless of the sequence of failures.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method of controlling communications in a shared protection architecture, where first and second network elements support communications over a plurality of working channels of respective rings using a shared protection channel common to all of said rings, comprising the steps of:

responsive to an indicated span switch on a first ring, wherein the span switch is not between the first and second network elements, passing control information for said first ring over said shared protection channel while indicating availability of the shared protection channel to other rings; and responsive to an indication that the shared protection channel is needed to pass communications traffic for a second ring, ceasing to pass the control information for said first ring over said shared protection channel and indicating the non-availability of the shared protection channel to rings other than said second ring.

2. The method of claim 1, and further comprising the step of indicating a lockout of protection (LOP) for any ring indicating a span switch while the span switch exist on said first ring and prior to said indication that the shared protection channel is needed to pass communications.

3. The method of claim 1 wherein said step of indication the non-availability of the shared protection ring comprises the step of generating a lockout of protection (LOP) on protection channels for any ring other than said second ring while said shared protection span is need to pass communications for said second ring.

4. The method of claim 1 wherein said step of ceasing to pass control information is responsive to an indicated ring switch on said second ring.

5. The method of claim 4 wherein said step of ceasing to pass control information is responsive to span switch on said second ring formed between said first and second network elements.

6. The method of claim 4 and further comprising the step of generating a span switch signal on non-shared protection channels associated with said second ring.

7. A communications network using a shared protection architecture over a plurality of communication rings, each ring comprising one or more working channels for passing communications traffic, comprising:
- first and second shared protection network elements supporting communications traffic over working channels for a predetermined set of said rings using a shared protection channel, said first and second shared protection network elements including control circuitry for:
  - passing control information for a first ring over said shared protection channel while indicating availability of the shared protection channel to rings other than said first ring, responsive to an indicated span switch on a first ring; and
  - ceasing to pass the control information for said first ring over said shared protection channel, responsive to an indication that the shared protection channel is needed to pass communications traffic for a second ring; and
  - circuitry for indicating the non-availability of the shared protection channel to rings other than said second ring, responsive to an indication that the shared protection channel is needed to pass communications traffic for a second ring.

8. The communications network of claim 7, wherein said control circuitry further comprising circuitry for indicating a lockout of protection (LOP) for any ring indicating a span switch while the span switch exist on said first ring and prior to said indication that the shared protection channel is needed to pass communications.

9. The communications network of claim 7 wherein said circuitry for indicating the non-availability of the shared protection ring comprises circuitry for generating a lockout of protection (LOP) on protection channels for any ring other than said second ring while said shared protection span is need to pass communications for said second ring.

10. The communications network of claim 7 wherein said circuitry for ceasing to pass control information is responsive to an indicated ring switch on said second ring.

11. The communications network of claim 10 wherein said circuitry for ceasing to pass control information is responsive to a span switch on said second ring formed between said first and second network elements.

12. The communications network of claim 11 wherein said control circuitry further comprises circuitry for generating a span switch signal on non-shared protection channels associated with said second ring.

13. A shared protection network element for use in a communications network using a shared protection architecture wherein communications traffic is passed over a plurality of communication rings, each ring comprising one or more working channels for passing communications traffic, and where a shared protection channel is used by the network element to protect a set of said working channels, comprising:
- circuitry for passing control information for a first ring over said shared protection channel while indicating availability of the shared protection channel to other rings, responsive to an indicated span switch on a first ring;
- circuitry for ceasing to pass the control information for said first ring over said shared protection channel, responsive to an indication that the shared protection channel is needed to pass communications traffic for a second ring; and
- circuitry for indicating the non-availability of the shared protection channel to rings other than said second ring, responsive to an indication that the shared protection channel is needed to pass communications traffic for a second ring.

14. The communications network of claim 13 and further comprising circuitry for indicating a lockout of protection (LOP) for any ring indicating a span switch while the span switch exists on said first ring and prior to said indication that the shared protection channel is needed to pass communications.

15. The communications network of claim 13 wherein said circuitry for indicating the non-availability of the shared protection ring comprises circuitry for generating a lockout of protection (LOP) on protection channels for any ring other than said second ring while said shared protection span is need to pass communications for said second ring.

16. The communications network of claim 13 wherein said circuitry for ceasing to pass control information is responsive to an indicated ring switch on said second ring.

17. The communications network of claim 16 wherein said circuitry for ceasing to pass control information is responsive to a span switch on said second ring formed between said first and second network elements.

18. The communications network of claim 17 and further comprising circuitry for generating a span switch signal on non-shared protection channels associated with said second ring.

* * * * *